United States Patent Office 3,234,032
Patented Feb. 8, 1966

3,234,032
ANTIFOULING MARINE COATING COMPOSITION
John R. Leebrick, Roselle Park, N.J., Alexander Ross, Erlenbach, Zurich, Switzerland, and Robert J. Zedler, White Plains, N.Y., assignors, by mesne assignments, to M.T. Chemicals Inc., New York, N.Y., a corporation of Delaware
No Drawing. Filed July 26, 1962, Ser. No. 212,735
22 Claims. (Cl. 106—15)

This invention relates to a method for treating a surface to render it durably resistant to fouling. More specifically, it relates to an anti-fouling marine coating composition.

As is well known to those skilled in the art, surfaces which are exposed for extended periods of time to marine conditions are highly susceptible to fouling. Metal, fiberglass, or wood surfaces, including boat bottoms, marine structures such as piers, docks, etc. become coated with a wide variety of undesirable marine organisms with the result that maintenance of the structure becomes difficult. In the case of boat bottoms, the fouling may result in a decreased ability to attain desired speed or to otherwise maneuver.

Fouling of ship bottoms and other similar surfaces may arise because of the presence of various marine organisms including algae, barnacles, tubeworms, hydroids, oysters, bryozoans, tunicates, etc. These organisms may attach themselves to the surface and build up substantial deposits thereon. In tropical waters, it is not uncommon to find that under some conditions, a surface may be fouled in a period of one month or even less to a degree which seriously impairs its effectiveness.

Prior attempts to minimize or eliminate this problem by controlling the deposition and growth of these marine organisms have included use of certain marine coating compositions, typically paints, which contained anti-fouling ingredients. Many of these paints have included various compounds of copper, typically cuprous oxide. Copper-containing anti-fouling paints have, however, been found to be less than fully satisfactory. For example, copper oxide-containing paints are not effective against all marine organisms such as tubeworms, hydroids, etc. They are particularly ineffective against algae; and algae is one of the major causes of fouling.

Certain organotin compounds have also been suggested as anti-fouling agents. Typical of these may be noted triphenyltin chloride, triethyltin sulfate, triethyltin chloride, triphenyltin acetate, hexabutyl distannoxane, hexapropyl distannoxane and hexaphenyl distannoxane. Although these organotin compounds, and particularly hexabutyl distannoxane, have provided relatively satisfactory anti-fouling protection, there are many applications in which a greater durability of activity may be desired. In particular, it would be highly desirable to achieve greater durability where the surface treated is the hull of a boat which is in year-round service. Where certain of these compounds, e.g., triethyltin chloride, have been employed it has been necessary to use undesirably large amounts of the organotin compounds, which has in turn increased both the expense and the mammalian toxicity of the coating composition.

It is an object of this invention to provide a novel process for treating surfaces to render them more durably resistant to fouling. It is a further object to provide novel anti-fouling coating compositions. Other objects will become apparent to those skilled in the art upon inspection of the following description.

According to certain of its aspects, this invention relates to a method for treating a surface to render it durably resistant to fouling which comprises applying to said surface an anti-fouling marine coating composition containing a compound $(R_3Sn)_2S$ wherein R is a lower alkyl radical; said compound $(R_3Sn)_2S$ being present in the anti-fouling amount of about 2.5–40% by weight of the anti-fouling marine coating composition.

The active component of these novel anti-fouling marine coating compositions may include organotin compounds of the formula $(R_3Sn)_2S$ wherein R may be an alkyl group and equivalent hydrocarbon groups and preferably a lower alkyl group. Lower alkyl groups may be those containing less than about nine carbon atoms. In the most preferred embodiment of this invention, the total number of carbon atoms present in $R_3$ may be 9–12. Most preferably, R may be an alkyl radical containing 3–4 carbon atoms. Typically, the most preferred R groups may include the n-propyl, isopropyl, n-butyl, isobutyl, sec-butyl and tert-butyl groups. All the R groups need not be the same although preferably they will be.

Typical preferred $(R_3Sn)_2S$ compounds wherein $R_3$ contains a total of 9–12 carbon atoms may include bis(tri-n-butyltin) sulfide, bis(tri-n-propyltin) sulfide, bis(triisobutyltin) sulfide, bis(tri-sec-butyltin) sulfide, bis(tri-tert-butyltin) sulfide, (tri-isopropyltin) sulfide, bis(amyl diethyltin) sulfide, bis(triallyltin) sulfide, bis(vinyl di-n-butyltin) sulfide, bis(n-propyl di-n-butyltin) sulfide, etc. The most preferred $(R_3Sn)_2S$ compound may be bis(tri-n-butyltin) sulfide.

These compounds may conveniently be prepared by the reaction of a compound of the formula $R_3SnCl$ with sodium sulfide according to the equation:

$$2R_3SnCl + Na_2S \rightarrow (R_3Sn)_2S + 2NaCl$$

This reaction may typically be carried out in a suitable inert solvent such as water, benzene, hexane, tetrahydrofuran, etc. The product $(R_3Sn)_2S$ may then be isolated by simple physical separation of layers where water is employed, or by filtration and distillation where organic solvents are used. For example, it may be possible to produce bis(tri-n-butyltin) sulfide by the reaction of tri-n-butyltin chloride with an aqueous solution of sodium sulfide:

$$2(C_4H_9)_3SnCl + Na_2S \xrightarrow{H_2O} [(C_4H_9)_3Sn]_2S + 2NaCl$$

The reactants may be mixed and on completion of the reaction, the product may be separated by decantation, water washed, and dried as by anhydrous calcium sulfate.

Preferably, the anti-fouling marine coating compositions of this invention may comprise an anti-fouling amount of a compound $(R_3Sn)_2S$ wherein R is a lower alkyl radical, and an inert diluent. An inert diluent is one which does not react with $(R_3Sn)_2S$. Typical inert diluent may include solvents, waves, oils, paints, lacquers, varnishes, etc. Preferably, the inert diluent may be a film-forming vehicle. Typically, the compound $(R_3Sn)_2S$ may be present in the anti-fouling amount of about 2.5–40% by weight of the anti-fouling marine coating composition.

According to certain aspects of this invention the anti-fouling marine coating compositions may comprise an anti-fouling amount of $(R_3Sn)_2S$ and an inert volatile solvent. Such solvents may include benzene, toluene, mineral spirits, naphtha, ligroin, etc. Where these compositions are employed, they may typically comprise a 2.5–40% by weight solution of $(R_3Sn)_2S$ in the appropriate solvent. Preferably they may be 5–20%, say 15% solutions, by weight. Larger amounts of $(R_3Sn)_2S$ may be employed, although little apparent advantage may be obtained thereby.

According to certain other aspects of this invention, the anti-fouling marine coating compositions may preferably comprise an anti-fouling amount of $(R_3Sn)_2S$ and a film-forming vehicle. Typical film-forming vehicles which may be employed in the practice of this invention may be materials which form a preferably continuous coating or film on the surface of the treated surface. Typical of such film-forming vehicles may be noted waxes, oils, paints, lacquers, varnishes, etc. In order to realize the fullest benefits of this invention, i.e., the greatest durability, it may be desirable that the coating formed by the film be water-resistant, i.e., that it not be readily removed from the treated surface by water.

Certain of the aforementioned film-forming vehicles may be composed of a single component, e.g., waxes and oils. Typical suitable waxes may include mineral waxes, e.g., microcrystalline mineral wax, vegetable waxes, e.g., carnauba wax and candellila wax, animal waxes, e.g., beeswax, etc. Typical suitable oils may include high-boiling liquid paraffine hydrocarbons. In these cases the composition of the coating produced on the treated surface may be substantially the same as that of the coating composition employed.

Other examples of suitable film-forming vehicles may be those wherein the vehicle comprises a non-volatile component and a volatile component, e.g., a solvent or thinner. Typical of these film-forming vehicles may be paints, lacquers, varnishes, etc. Where such film-forming vehicles are employed, the composition of the coating produced may be substantially the same as the non-volatile portion of the coating composition. The non-volatile portion of the anti-fouling coating composition may be the compound $(R_3Sn)_2S$ plus the non-volatile component of the film-forming vehicle.

Preferably, the film-forming vehicle may be a paint, and preferably it may be a paint having as its base a synthetic polymeric material. The preferred synthetic polymeric materials may include vinyl polymers, acrylic polymers and alkyd polymers.

Vinyl polymers are the materials produced by the polymerization of monomers containing the vinyl ($CH_2=CH-$) group. Typical vinyl polymers suitable for use in this invention may include polymers and copolymers of vinyl chloride, vinyl acetate, styrene, etc. A typical suitable vinyl polymer may be a vinyl acetate-vinyl chloride copolymer such as that sold under the trademark VAGH.

Acrylic polymers are the materials produced by the polymerization of derivatives of acrylic acid. Typical acrylic polymers may include polymers and copolymers of ethyl acrylate, methyl methacrylate, butyl methacrylate, cyclohexyl acrylate, acrylonitrile, etc. A preferred acrylic polymer may be a methyl methacrylate-butyl methacrylate copolymer such as that sold under the trademark Acryloid F–10.

Alkyd polymers are the materials produced by the condensation polymerization of polybasic acids, e.g., sebacic acid, succinic acid, and maleic acid, terephthalic acid; anhydrides of polybasic acids, e.g., phthalic anhydride and maleic anhydride, or esters of polybasic acids; e.g., dimethyl terephthalate, diethyl maleate, with polybasic alcohols, e.g., ethylene glycol, propylene glycol, and glycerine. A typical suitable alkyd polymer is a long oil soya alkyd resin such as that sold under the trademark Aroplaz 1248-ML–70. Long oil soya alkyd resins are glyceryl phthalate resins modified by the use of 64–75% by weight oil and 23–28% by weight phthallic anhydride.

The aforementioned synthetic polymeric materials, which may be included in the non-volatile component of the vehicle, may be dissolved in the volatile component, which may include a suitable solvent or thinner, to form a solution having a viscosity suitable for easy application to the surface to be treated. Typically such solvents may include mineral spirits, naphtha, benzene, toluene, xylene, methyl ethyl ketone, chlorobenzene, and petroleum distillate fractions.

The non-volatile component of the film-forming vehicle may also contain, in addition to the above noted materials, thickeners, typified by bentonite; filters, typified by aluminum silicate and calcium silicate; pigments, typified by titanium dioxide; driers, typified by cobalt naphthenate and manganese naphthenate; etc.

It is a particular feature of this invention that the compound $(R_3Sn)_2S$ may be highly effective in imparting anti-fouling qualities to the treated surface when employed in amounts which may be considerably smaller than those required for prior art anti-fouling agents. Typically, when $(R_3Sn)_2S$ is employed in a composition containing a film-forming vehicle it may be used in the anti-fouling amount of about 2.5–40% by weight of the total anti-fouling coating composition as noted supra for a solvent coating composition. It may be found, for reasons of economy and convenience, that where the compound $(R_3Sn)_2S$ is employed in a coating composition containing a film-forming vehicle it may more suitably be present in the anti-fouling amount of about 2.5–20% by weight of the total anti-fouling coating composition. Preferably, the compound $(R_3Sn)_2S$ may be present in the anti-fouling amount of 5.0–12.0, say 10.0% by weight of the total anti-fouling coating composition. Where the anti-fouling coating composition contains a non-volatile component other than $(R_3Sn)_2S$ and a volatile component (e.g., as in a paint, varnish, or the like), the compound $(R_3Sn)_2S$ may typically be present in the amount of about 4.5–35.0% by weight, preferably 8.0–20% by weight, say 17% of the total non-volatile portion of the anti-fouling coating composition. Larger amounts of $(R_3Sn)_2S$ may be employed, although little apparent advantage may be obtained thereby.

The anti-fouling coating compositions of this invention may be formulated by dissolving or dispersing the compound $(R_3Sn)_2S$ in the film-forming vehicle. Since the $(R_3Sn)_2S$ compounds may be liquids at room temperature, this may be accomplished by adding them to the film-forming vehicle with moderate stirring. Where the film-forming vehicle may be a solid at room temperature, e.g., where it is a wax, it may be desirable to heat it above its melting point before adding the $(R_3Sn)_2S$ compound.

Typical examples of anti-fouling marine coating compositions formulated according to the practice of this invention may include the following, wherein all parts are by weight.

*Example 1.—Wax coating composition*

Film-forming vehicle: 100 parts of microocrystalline petroleum wax $(R_3Sn)_2S$: 20 parts of bis(tri-n-butyltin)sulfide.

*Example 2.—Varnish coating composition*

Film-forming vehicle:
    39 parts of phenol-formaldehyde colophony resin
    48 parts of ferric oxide pigment
    100 parts of toluene $(R_3Sn)_2S$: 13 parts of bis(tri-isopropyltin)sulfide.

*Example 3.—Alkyd paint coating composition*

Film-forming vehicle:
    349.55 parts of titanium dioxide
    58.08 parts of calcium silicate
    3.58 parts of bentonite
    374.08 parts of 70% long oil soya alkyd resin solution
    4.80 parts of cobalt naphthenate drier
    64.90 parts in 40% thixotropic resin solution*
    15.70 parts of manganese naphthenate drier
    122.55 parts of mineral spirits $(R_3S_n)_2S$: 11.70 parts of bis(tri-sec-butyltin)sulfide

*40% by weight solution in mineral spirits of the reaction product of a glyceryl phthalate alkyd with the polyamide prepared from dimerized linseed oil fatty acid and diethylene triamine.

*Example 4.—Acrylic paint coating composition*

Film-forming vehicle:
    13.9 parts of titanium dioxide 13.9 parts of aluminum silicate
13.9 parts of methyl methacrylate-butyl methacrylate copolymer
5.2 parts of mineral spirits
$(R_3Sn)_2S$: 8.0 parts of bis(tri-n-propyltin)sulfide

*Example 5.—Vinyl paint coating composition*

Film-forming vehicle:
16.8 parts of titanium dioxide
1.6 parts of bentonite
11.5 parts of vinyl chloride-vinyl acetate copolymer
1.2 parts of tricresyl phosphate
25.0 parts of toluene
33.3 parts of methyl isobutyl ketone
$(R_3Sn)_2S$: 6.0 parts of bis(tri-n-butyltin)sulfide

*Example 6.—Solvent coating composition*

Film-forming vehicle:
85.0 parts of mineral spirits
15.0 parts of bis(tri-isobutyltin)sulfide These and similar formulations may be applied to the surface to be treated by such techniques as rubbing, brushing, spraying, dipping, wicking, etc. The treated surface may then be found to be highly resistant to fouling by marine organisms for unexpectedly long periods of time.

In order to illustrate the novel and unexpected effectiveness of compounds of the formula $(R_3Sn)_2S$ as anti-fouling agents, the following illustrative comparative experiments were conducted.

*Example 7*

Standard acrylic paint film-forming vehicles were made up as follows:

| Material: | Parts by weight |
|---|---|
| Titanium dioxide | 158.00 |
| Aluminum silicate | 47.40 |
| Fibrous talc | 110.60 |
| Acrylic polymer* | 465.83 |
| Mineral spirits | 146.15 |

*The 40% solution of butyl methacrylate-methyl methacrylate copolymer in mineral thinner sold under the trademark Acryloid F-10.

The anti-fouling coating compositions were prepared by adding to the above film-forming vehicle 62.15 parts by weight of the anti-fouling agent noted infra. This is equivalent to 0.62 lb./gal. of anti-fouling agent or 6.25% by weight of the total coating composition or 11.0% by weight of the total non-volatile portion thereof. Test panels made of Masonite brand of lignocellulose hardboard were painted (2 coats) with each of the so-prepared anti-fouling coating compositions and were immersed below tide level in the sea at Miami Beach, Florida, in mid-December. These panels were periodically raised and inspected. The results of the inspection were reported as the percent of the surface which was not covered by fouling organisms. Thus, a "fouling rate" of 100 indicates no fouling, while a rate of 0 indicates complete coverage of the test panel with fouling organisms.

The anti-fouling coating compositions contained the following anti-fouling agents:

| Composition: | Anti-fouling agent |
|---|---|
| A | Bis(tri-n-butyltin)sulfide. |
| B | Tri-n-butyltin chloride. |
| C | Hexa-n-butyl distannoxane. |
| D | Tri-n-butyltin laurate. |
| E | Tri-n-butyltin resinate. |

The fouling rates for these compositions are set forth in Table I.

TABLE I

| Composition | Fouling Rate at Months | | | | | | |
|---|---|---|---|---|---|---|---|
| | 1 | 3 | 6 | 8 | 10 | 12 | 16 |
| A | 100 | 93 | 85 | 70 | 94 | 83 | 68 |
| B | 100 | 70 | 0 | 0 | 0 | 0 | 0 |
| C | 100 | 100 | 85 | 0 | 0 | 0 | 0 |
| D | 100 | 89 | 0 | 0 | 0 | 0 | 0 |
| E | 100 | 0 | 0 | 0 | 0 | 0 | 0 |

It may be seen from Table I that bis(tri-n-butyltin)sulfide unexpectedly retains its activity against fouling organisms for surprisingly long periods of time. In fact, bis(tri-n-butyltin)sulfide may remain effective for more than twice as long as an equivalent amount of hexabutyldistannoxane which is generally considered to be the best commercially available organotin anti-fouling agent. Results similar to those of composition A may be observed when other $(R_3Sn)_2S$ compounds as hereinbefore described, are substituted for bis(tri-n-butyltin)sulfide.

*Example 8*

Standard acrylic paint film-forming vehicles were made up as follows:

| Material: | Parts by weight |
|---|---|
| Titanium dioxide | 159.89 |
| Aluminum silicate | 47.97 |
| Fibrous talc | 11.93 |
| Acrylic polymer * | 433.84 |
| Mineral spirits | 147.90 |

*The 40% solution of butyl methacrylate-methyl methacrylate copolymer in mineral thinner sold under the trademark Acryloid F-10.

The anti-fouling coating compositions were prepared by adding to the above film-forming vehicle 100.47 parts by weight of the noted anti-fouling agent. This is equivalent to 1.0 lb./gal. of anti-fouling agent or 10.0% by weight of the total coating composition or 17.65% by weight of the non-volatile portion thereof. Test panels were painted, immersed, and rated as in Example 1 and the letters A through E designate the same anti-fouling agent as in Example 1. The results of this test are shown in Table II.

TABLE II

| Composition | Fouling Rate at Months | | | | | | |
|---|---|---|---|---|---|---|---|
| | 1 | 3 | 6 | 8 | 10 | 12 | 16 |
| A | 100 | 100 | 85 | 70 | 94 | 86 | 70 |
| B | 100 | 90 | 65 | 0 | 0 | 0 | 0 |
| C | 100 | 100 | 95 | 11 | 0 | 0 | 0 |
| D | 100 | 100 | 0 | 0 | 0 | 0 | 0 |
| E | 100 | 49 | 0 | 0 | 0 | 0 | 0 |

The highly durable activity achieved with the anti-fouling marine coating compositions of this invention containing the compounds $(R_3Sn)_2S$ is quite surprising, especially when the place of immersion is considered. The waters surrounding Miami Beach, Florida, are characterized by an unusually high concentration of marine organisms and provide a strenuous test for anti-fouling coating compositions. For example, a coating composition similar to those noted supra containing 10.0% triphenyltin chloride was found to have lost substantially all of its activity after only 6 months of immersion. Triphenyltin chloride has been reported as a highly durable anti-fouling agent.

*Example 9*

Another specific anti-fouling composition which may be formulated in accordance with this invention and that may possess similar characteristics to those heretofore disclosed may include the following materials:

Material: Pound
- Fibrous talc _____ 2.2
- Aluminum silicate _____ 9.2
- Titanium dioxide _____ 31.0
- Acrylic polymer * _____ 33.6
- Mineral spirits _____ 50.5
- Aromatic petroleum naphtha _____ 28.6
- Bis(tri-n-propyltin)sulfide _____ 15.0

* Homopolymer of methyl methacrylate having a weight average molecular weight of about 200,000.

Although this invention has been illustrated by means of certain specific examples, it will be obvious to those skilled in the art that many changes may be made thereto without departing from the scope of the invention. It is not to be limited, therefore, to the specific illustrative embodiments, but solely by the appended claims.

We claim:
1. The method for treating a surface to render it durably resistant to fouling which comprises applying to said surface an anti-fouling marine coating composition containing a compound $(R_3Sn)_2S$ wherein R is a lower alkyl radical; said compound $(R_3Sn)_2S$ being present in the anti-fouling amount of 2.5–40% by weight of the anti-fouling marine coating composition.
2. The method for treating a surface as claimed in claim 1 where in the total number of carbon atoms in $R_3$ is 9–12.
3. The method for treating a surface as claimed in claim 1 wherein R is a butyl radical.
4. The method for treating a surface as claimed in claim 1 wherein R is a propyl radical.
5. The method for treating a surface to render it durably resistant to fouling which comprises applying to said surface an anti-fouling marine coating composition comprising a compound $(R_3Sn)_2S$ wherein R is a lower alkyl radical, and an inert solvent; said compound $(R_3Sn)_2S$ being present in the anti-fouling amount of 5–20% by weight of the anti-fouling marine coating composition.
6. The method for treating a surface to render it durably resistant to fouling which comprises applying to said surface an anti-fouling marine coating composition comprising a compound $(R_3Sn)_2S$ wherein R is a lower alkyl radical, and a film-forming vehicle; said compound $(R_3Sn)_2S$ being present in the anti-fouling amount of 2.5–20% by weight of the anti-fouling marine coating composition.
7. The method for treating a surface as claimed in claim 6 wherein the total number of carbon atoms in $R_3$ is 9–12.
8. The method for treating a surface to render it durably resistant to fouling which comprises applying to said surface an anti-fouling marine coating composition comprising a compound $(R_3Sn)_2S$ wherein R is a lower alkyl radical, and a film-forming vehicle having a volatile component and a non-volatile component; said compound $(R_3Sn)_2S$ being present in the anti-fouling amounts of 4.5–35% by weight of the non-volatile portion of the anti-fouling marine coating composition and 2.5–20% by weight of the total anti-fouling marine coating composition.
9. The method for treating a surface as claimed in claim 8 wherein the total number of carbon atoms contained in $R_3$ is 9–12.
10. The method for treating a surface as claimed in claim 8 wherein R is a butyl radical.
11. The method for treating a surface as claimed in claim 10 wherein the film-forming vehicle is an acrylic base paint.
12. The method for treating a surface as claimed in claim 10 wherein the film-forming vehicle is a vinyl base paint.
13. An anti-fouling marine coating composition consisting essentially of a compound $(R_3Sn)_2S$ wherein R is a lower alkyl radical, and an inert organic diluent; said compound $(R_3Sn)_2S$ being present in the anti-fouling amount of 2.5–40% by weight of the anti-fouling marine coating composition.
14. An anti-fouling marine coating composition consisting essentially of a compound $(R_3Sn)_2S$ wherein R is a lower alkyl radical, and a film-forming vehicle; said compound $(R_3Sn)_2S$ being present in the anti-fouling amount of 2.5–20% by weight of the anti-fouling marine coating composition.
15. An anti-fouling marine coating composition comprising a compound of the formula $(R_3Sn)_2S$ wherein R is a lower alkyl radical; and a film-forming base paint having a volatile component and a non-volatile component; said compound $(R_3Sn)_2S$ being present in the anti-fouling amounts of 4.5–35% by weight of the non-volatile portion of the anti-fouling marine coating composition and 2.5–20% by weight of the total anti-fouling marine coating composition.
16. An anti-fouling marine coating composition as claimed in claim 15 wherein the total number of carbon atoms in $R_3$ is 9–12.
17. An anti-fouling marine coating composition as claimed in claim 15 wherein R is a butyl radical.
18. An anti-fouling marine coating composition as claimed in claim 15 wherein R is a propyl radical.
19. An anti-fouling marine coating composition as claimed in claim 15 wherein the compound $(R_3Sn)_2S$ is present in the amount of 8.0–20% by weight of the non-volatile portion of the anti-fouling marine coating composition.
20. An anti-fouling marine coating composition as claimed in claim 15 wherein the film-forming vehicle is an acrylic base paint.
21. An anti-fouling marine coating composition as claimed in claim 15 wherein the film-forming vehicle is a vinyl base paint.
22. An anti-fouling marine coating composition comprising a compound $(R_3Sn)_2S$ wherein R is a butyl radical, and an acrylic base paint having a volatile component and a non-volatile component; said compound $(R_3Sn)_2S$ being present in the anti-fouling amounts of 8.0–20% by weight of the non-volatile portion of the anti-fouling coating composition and 2.5–20% by weight of the total anti-fouling marine coating composition.

References Cited by the Examiner

UNITED STATES PATENTS

| | | | |
|---|---|---|---|
| 2,957,785 | 10/1960 | Leatherland | 106—15 XR |
| 3,081,175 | 3/1963 | Waite et al. | 106—15 |

FOREIGN PATENTS 851,902  10/1960  Great Britain.

OTHER REFERENCES

"The Condensed Chemical Dictionary," Sixth Ed., Reinhold Publishing Corporation, New York, 1961, page 1160.

ALEXANDER H. BRODMERKEL, *Primary Examiner.*

MORRIS LIEBMAN, *Examiner.*